United States Patent [19]

Borzone

[11] Patent Number: 5,562,547
[45] Date of Patent: Oct. 8, 1996

[54] SELF-ATTACHMENT SCREW

[76] Inventor: Richard Borzone, 266 Constitution Ave., Toms River, N.J. 08753

[21] Appl. No.: 289,797

[22] Filed: Aug. 12, 1994

[51] Int. Cl.$^6$ .............................. B21H 3/02; B23G 9/00; F16B 23/00
[52] U.S. Cl. ................. 470/9; 470/11; 411/403; 411/407
[58] Field of Search ........................... 411/402, 403, 411/404, 405, 407, 410, 406; 470/9, 11

[56] References Cited

U.S. PATENT DOCUMENTS

| | | | |
|---|---|---|---|
| 1,934,347 | 11/1933 | Flesselles | 411/407 |
| 2,304,704 | 12/1942 | O'Leary | 411/406 |
| 2,676,510 | 4/1954 | Hodell | 411/407 |
| 4,033,003 | 7/1977 | Marroquin | 470/11 X |
| 4,084,478 | 4/1978 | Simmons | 411/404 |
| 4,497,225 | 2/1985 | Vaughn | 411/407 X |
| 4,538,486 | 9/1985 | Lutrat | 411/407 X |

*Primary Examiner*—Neill R. Wilson
*Attorney, Agent, or Firm*—Mathews, Woodbridge & Collins

[57] ABSTRACT

The present invention relates to a burred fastener for forming a friction fit between the fastener and a driver. The friction fit retains the fastener in contact with the driver during insertion, tightening and loosening of the fastener into a work surface. Burrs are formed in the inner side surfaces of an indentation or slot formed in the fastener head. A method for forming the burred fasteners includes striking the screw head with a deformation object.

2 Claims, 2 Drawing Sheets

SELF-ATTACHMENT SCREW

BACKGROUND OF THE INVENTION

1. Field of the Invention

The present invention relates to a fastener with a modified head for allowing the fastener to attach itself to a conventional screwdriver.

2. Description of the Related Art

Conventional screws are used in a wide range of applications. Typically, a screwdriver is used for tightening and loosening of the screw. Often when the screw is first tightened into a material, the screw must be manually held against the screwdriver to retain the screwdriver within the slot of the screwhead. Similarly, it is often difficult to loosen a screw after insertion into the material without manually holding the screwhead against the screwdriver. If the screw is not manually held, the screw slips out of contact with the head of the screwdriver. Thus, the problem of retaining contact between the screw and the screw head has persisted for users of screwdrivers.

One conventional solution describes a combination of a screwdriver and screw for locking the screw to the screwdriver, as described in U.S. Pat. No. 4,538,486. A screwdriver has a blade tip with outwardly extending inclined edges in a diametrically opposed pie slice configuration. A threaded screw includes diametrically opposed pairs of pie slices on either side of a transverse slot for complementally engaging the screwdriver blade. The combination of the modified screwdriver and modified screw prevents the screw head from slipping during unscrewing of the screw.

U.S. Pat. No. 1,997,422 describes a screw and driver for operatively connecting the screw to the driver before the screw is inserted into or after being withdrawn from a work. A bit formed in the driver engages a slot in the head of the screw. The above-described patents have the shortcoming of modifying both the screw and the screwdriver which results in a complex apparatus having high manufacturing costs.

Of possible general reference are U.S. Pat. No. 4,311,071 related to a screwdriver and screwhead system and U.S. Pat. No. 3,641,848 related to a cylindrical nut and wrench system.

SUMMARY OF THE INVENTION

Briefly described, the present invention comprises a self-attaching fastener having a plurality of burrs formed on an inner side surface of an indention in the head of the fastener. In one embodiment, a screw head has a hexagonally shaped indentation in the top surface thereof. A burr protrudes from each inner side wall of the indentation. Upon insertion of a driver into the indentation, the burrs contact the driver providing a friction fit between the driver and the fastener. The fastener is secured to the driver so that the fastener can be carried on the driver to a work surface and is held in place on the driver during tightening or loosening of the fastener into the work surface.

In other embodiments, the screw head can have either a single slot, a pair of perpendicular slots, a six-sided or a square indentation. Burrs are formed on the inner side walls of the slots or indentations.

A method of forming the burred fasteners of the present invention includes the steps of mounting the fastener and striking the fastener with a deformation object. The contact forms burrs in the inner side surfaces of an indentation in the fastener.

These and other features of the invention can be further understood with reference to the following drawings.

DETAILED DESCRIPTION OF THE INVENTION

During the course of this description like numbers will be used to identify like elements according to the different figures which illustrate the invention.

Figure 1A:
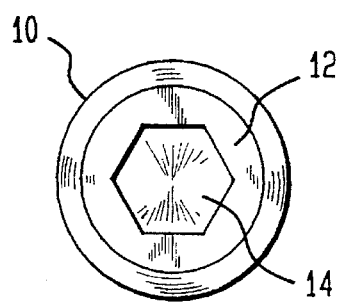
FIG. 1A is a top plan view of a prior art hexagonal screw.
Figure 1B:
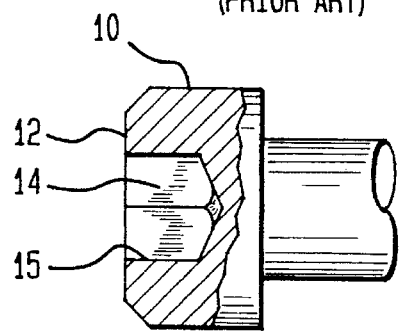
FIG. 1B is a cross-sectional side view of the hexagonal screw shown in FIG. 1A.
Figure 2:
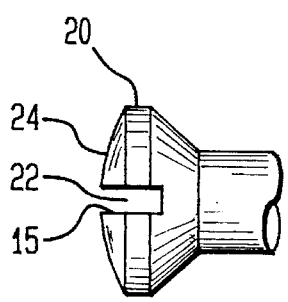
FIG. 2 is a side elevational view of a prior art slotted screw.

FIGS. 1A and 1B illustrate a prior art hexagonal screw 10. Screw head 12 includes a hexagonally shaped indentation 14. A screwdriver having a correspondingly shaped tip can be used for tightening or loosening hexagonal screw 10. Inner sidewall 15 of slot 14 is smooth. FIG. 2 illustrates a slotted conventional screw 20. Screwhead 24 includes slot 22. A correspondingly shaped conventional screwdriver tip can be used for tightening or loosening slotted screw 20. Hexagonal screw 10 and slotted screw 20 have the drawback of slipping from the respective screwdriver tips during tightening and loosening of the screws from a material.

Figure 3A:
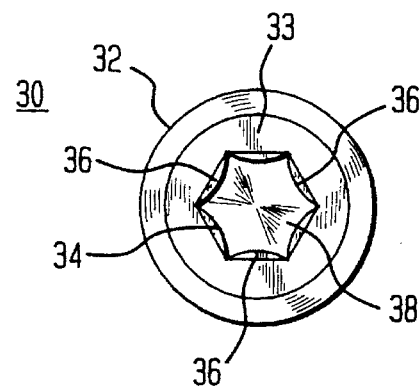
FIG. 3A is a top plan view of a burred fastener of the present invention having a hexagonal shaped indentation in the top surface of the fastener.
Figure 3B:
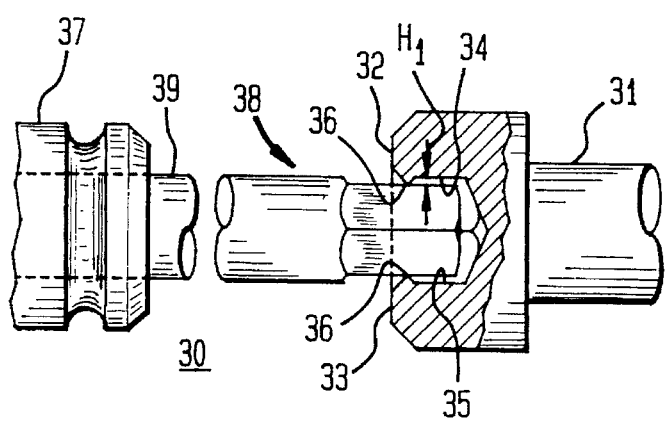
FIG. 3B is a vertical cross-sectional view of the burred fastener shown in FIG. 3A.

FIG. 3A and FIG. 3B illustrate burred fastener 30 in accordance with the teachings of the present invention. Head 32 has a hexagonally shaped indentation 38 in the top surface 33 thereof. Body 31 of fastener 30 is inserted into a material. Preferably body 31 has a threaded outer surface. Burrs 36 protrude from each inner side wall 34 of head 32. Upon insertion of hexagonal screwdriver 37 into hexagonally shaped indentation 38, burrs 36 contact side surface 39 of screwdriver 37. In this embodiment, six burrs 36 are formed on the inner surface 35 of hexagonally shaped indentation 38 for contacting the side surface 39 of screw driver 37 in six places.

Preferably, each burr 36 has a predetermined height $H_1$ for causing a friction fit between burr 36 and side surface 39 of screwdriver 37. The burred fasteners 30 provides self attachment to screwdriver 37. After screwdriver 37 is inserted into indentation 38, burred fastener 30 is secured to screwdriver 37 and can be carried on screwdriver 37 to or from a position adjacent a work surface. After burred fastener 30 is screwed into the work surface, screwdriver 37 can be pulled away from the work surface. The force generated by outwardly pulling screwdriver 37 from the work surface disengages screwdriver 37 from fastener 30.

Figure 4:
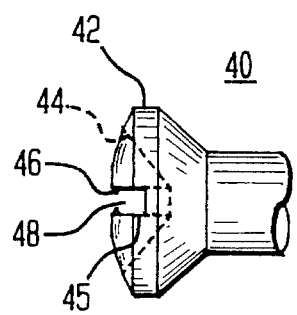
FIG. 4 is a side elevational view of the burred fastener of the present invention having a pair of perpendicular slots in the top surface of the fastener.

An alternative embodiment of a burred fastener 40 is shown in FIG. 4. Fastener head 42 has a pair of slots 44, 48. Preferably, slot 44 is positioned perpendicular to slot 48. Preferably, screw head 42 is a Phillips® screw head. Burrs 46 are formed on each side wall 45 of screw head 42. Burrs 46 contact a correspondingly shaped screwdriver tip.

Figure 5:
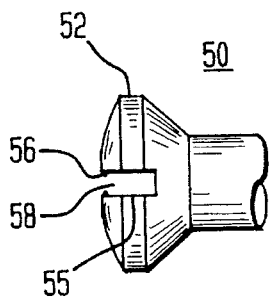
FIG. 5 is a side elevational view of the burred fastener of the present invention having a single slot in the top surface of the fastener.

FIG. 5 is a side elevational view of an alternative burred fastener 50. Slot 58 is formed in fastener head 52. Burrs 56 are formed on each side wall 55.

Figure 6:
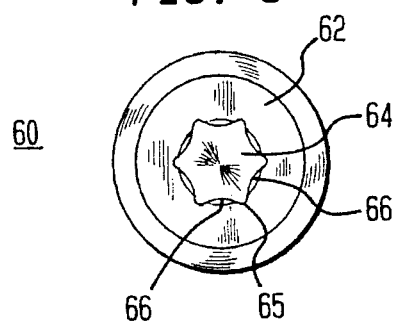
FIG. 6 is a top plan view of the burred-fastener of the present invention having a hexagonal deformation in the top surface of the fastener.

FIG. 6 illustrates a top plan view of a burred fastener 60 in accordance with an alternative embodiment of the invention. Six sided indentation 64 is formed in head 62. Burrs 66 are formed on the inside side walls 65 of indentation 64. Burrs 66 contact the side of a correspondingly shaped screwdriver. Screw head 62 can be for example a Torx Plus 201P screw head manufactured by Camcar, a division of Textron, Inc., which has the advantage of providing improved torque of 120 lbs/inch. Burred fastener 60 preferably can be used in medical applications, for example, to attach implants and hold bones together. A six sided indentation 64 has the advantage of providing improved torque with small screws. Typically, burred fastener 60 has a size of between 0.10 mm to 10 mm.

Figure 7:
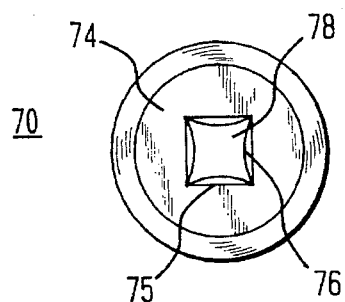
FIG. 7 is a top plan view of the burred fastener of the present invention having a square shaped indentation in the top surface of the fastener.

FIG. 7 is a top plan view of an alternative embodiment of a burred fastener 70. Square indentation 78 is formed in head 74. Burrs 76 are formed on each side wall 75 of square indentation 78. It will be appreciated that the burred fastener of the present invention can be used with other shapes of indentations in the screw heads.

Figure 8:
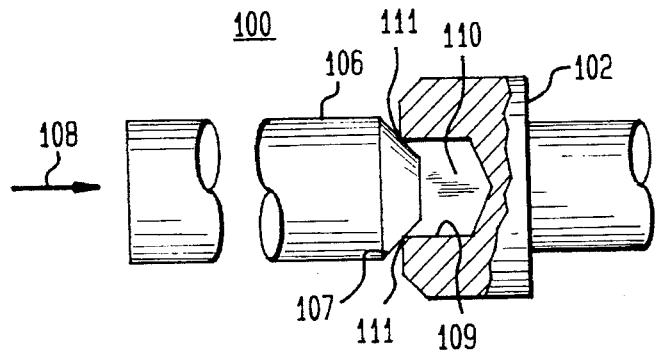
FIG. 8 is a side elevational view of an apparatus of the present invention for forming the burred fastener.
Figure 8A:
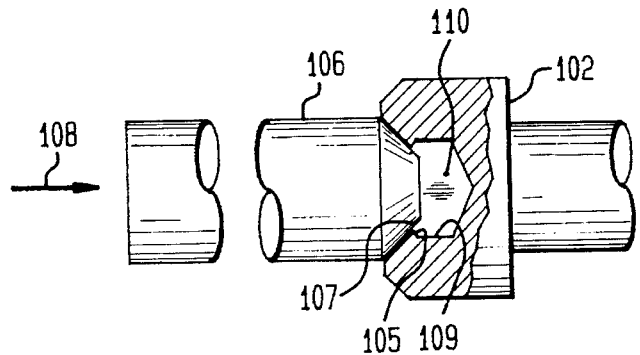
FIG. 8a is a side elevational view of the apparatus shown in FIG. 8 after the formation cone is displaced inward into the indentation.

FIG. 8 illustrates the method for forming a burred fastener 102. Burr forming cone 107 bears against indentation side surface 109 in fastener 102. Contact is first made between burr formation cone 107 and point 111 of indentation side surface 109. Force 108 directed against deformation object 106 forces cone 107 inward into indentation 110 for displacing material of portion 111 of fastener 102 inward into indentation 110. The displacement of portion 111 forms burrs 105 on indentation side surfaces 109.

The present invention has the advantage of achieving self-attachment of a fastener to a driver by providing burrs on the inside wall of an indentation in the head of the fastener. The method of the present invention allows any type of screw to be modified for self-attachment. The present invention is easy to use and inexpensive to manufacture.

While the invention has been described with reference to the preferred embodiment, this description is not intended to be limiting. It will be appreciated by those of ordinary skill in the art that modifications may be made without departing from the spirit and scope of the invention.

I claim:

1. A method for forming a burred fastener, said fastener having a head portion and an indentation formed in said head portion comprising the steps of:

striking said head portion with a deformation object, wherein at least one burr is formed on the inner side surface of said indentation, and wherein said deformation object has a cone shape.

2. A method for forming a burred fastener, said fastener having a head portion and an indentation formed in said head portion comprising the steps of:

striking said head portion with a deformation object, said deformation object has a cone shape, wherein at least one burr is formed on the inner side surface of said indentation and said striking step is performed with a force for moving said deformation object towards said fastener.

\* \* \* \* \*